United States Patent
Kihara et al.

(10) Patent No.: US 12,538,308 B2
(45) Date of Patent: Jan. 27, 2026

(54) CONTROL METHOD FOR IMAGE OUTPUT DEVICE AND DISPLAY SYSTEM

(71) Applicant: SEIKO EPSON CORPORATION, Tokyo (JP)

(72) Inventors: Hirohiko Kihara, Matsumoto (JP); Yasuhiro Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 363 days.

(21) Appl. No.: 17/993,112

(22) Filed: Nov. 23, 2022

(65) Prior Publication Data

US 2023/0171772 A1   Jun. 1, 2023

(30) Foreign Application Priority Data

Nov. 26, 2021 (JP) .................................. 2021-191791

(51) Int. Cl.
*H04W 72/1273* (2023.01)
*H04W 28/082* (2023.01)

(52) U.S. Cl.
CPC .............................. *H04W 72/1273* (2013.01)

(58) Field of Classification Search
CPC ......... H04W 72/1273; H04W 28/0942; H04W 28/0992; H04W 28/082; H04N 21/64738; H04N 21/8106
USPC ........................................................ 370/343
See application file for complete search history.

(56) References Cited

U.S. PATENT DOCUMENTS

| | | | | |
|---|---|---|---|---|
| 2006/0222008 A1* | 10/2006 | Aaron | ................. | H04L 41/5003 370/468 |
| 2016/0198198 A1* | 7/2016 | Iwami | ................. | H04N 21/2343 725/116 |
| 2016/0219606 A1* | 7/2016 | Amano | ............ | H04N 21/43637 |
| 2017/0063703 A1* | 3/2017 | Mani | ................... | H04L 43/0894 |
| 2020/0210133 A1* | 7/2020 | Bliss | ................... | G06F 16/9566 |
| 2021/0176733 A1* | 6/2021 | Kang | ................... | H04W 72/02 |

FOREIGN PATENT DOCUMENTS

| JP | 2005-340922 A | 12/2005 |
|---|---|---|
| JP | 2008-131341 A | 6/2008 |
| JP | 2008-136027 A | 6/2008 |

OTHER PUBLICATIONS

NEC, "NEC's Wireless Communications Stabilization Solution", published on Sep. 22, 2020, provided to POA on Nov. 4, 2022, 4 pages.
"Wireless LAN—What Does "Channel" Mean?", published on Dec. 17, 2009, Oct. 26, 2022 version provided to POA on Nov. 4, 2022, 8 pages.

* cited by examiner

*Primary Examiner* — Ayman A Abaza
*Assistant Examiner* — Tracy L Williams
(74) *Attorney, Agent, or Firm* — Dority & Manning, P.A.

(57) ABSTRACT

A control method for an image output device includes performing wireless communication with a display device using a first frequency band and a second frequency band, acquiring communication traffic of the first frequency band and communication traffic of the second frequency band, and, when the communication traffic of the first frequency band is smaller than the communication traffic of the second frequency band, transmitting audio data using the first frequency band and transmitting image data using the second frequency band.

12 Claims, 5 Drawing Sheets

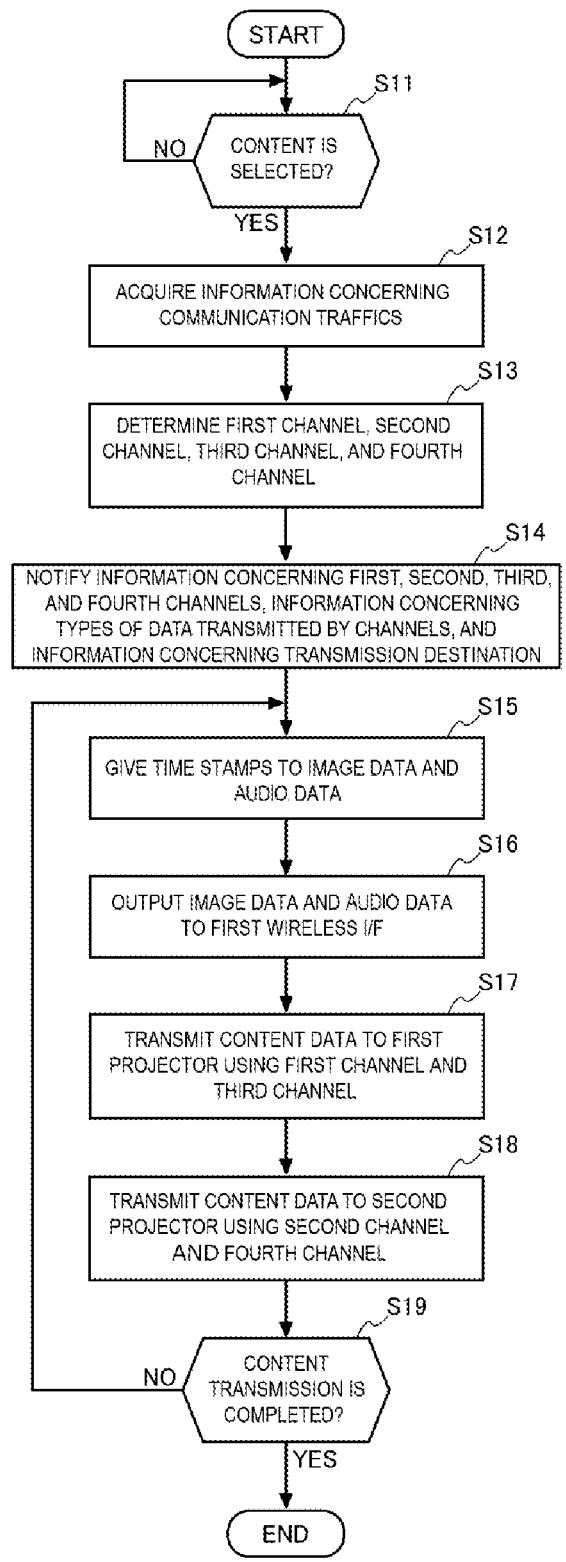

CONTROL METHOD FOR IMAGE OUTPUT DEVICE AND DISPLAY SYSTEM

The present application is based on, and claims priority from JP Application Serial Number 2021-191791, filed Nov. 26, 2021, the disclosure of which is hereby incorporated by reference herein in its entirety.

BACKGROUND

1. Technical Field

The present disclosure relates to a control method for an image output device and a display system.

2. Related Art

There has been known a technique for monitoring a congestion state of a transmission path in a network. There has been disclosed, for example, a real-time remote communication system including network monitoring means for monitoring a congestion state of a network, when transmitting streaming data at a congestion time of the network, the real-time remote communication system allocating a band necessary for audio packet data more preferentially than video packet data. The real-time remote communication system determines, based on a priority level included in the video packet data, processing for the video packet data at the congestion time of the network. The real-time remote communication system executes processing for, for example, allowing only an important frame of video packet data having a low priority level to pass or curtailing the number of frames in the case of a video having independent frames.

However, when a frequency band used for communication is divided into a plurality of channels to transmit image data and audio data, communication traffics are different depending on the channels. Accordingly, for example, when communication traffic of a channel used for data transmission increases, a necessary band sometimes cannot be secured.

SUMMARY

According to an aspect of the present disclosure, there is provided a control method for an image output device, the control method including: performing wireless communication with a display device using a first frequency band and a second frequency band; acquiring communication traffic of the first frequency band and communication traffic of the second frequency band; and, when the communication traffic of the first frequency band is smaller than the communication traffic of the second frequency band, transmitting audio data using the first frequency band and transmitting image data using the second frequency band.

According to an aspect of the present disclosure, there is provided a display system including an image output device and a display device. The image output device includes a first controller configured to execute: acquiring communication traffic of a first frequency band used for wireless communication with the display device and communication traffic of a second frequency band used for the wireless communication with the display device; and, when the communication traffic of the first frequency band is smaller than the communication traffic of the second frequency band, transmitting audio data using the first frequency band and transmitting image data using the second frequency band. The display device includes a audio output device and a display and includes a second controller configured to execute: receiving the audio data and the image data; causing the audio output device to output audio based on the received audio data; and causing the display to display, on a display surface, an image based on the image data.

BRIEF DESCRIPTION OF THE DRAWINGS

FIG. 5 is a flowchart showing the operation of the image output device.

DESCRIPTION OF EXEMPLARY EMBODIMENTS

1. Configuration of a Display System

Figure 1:
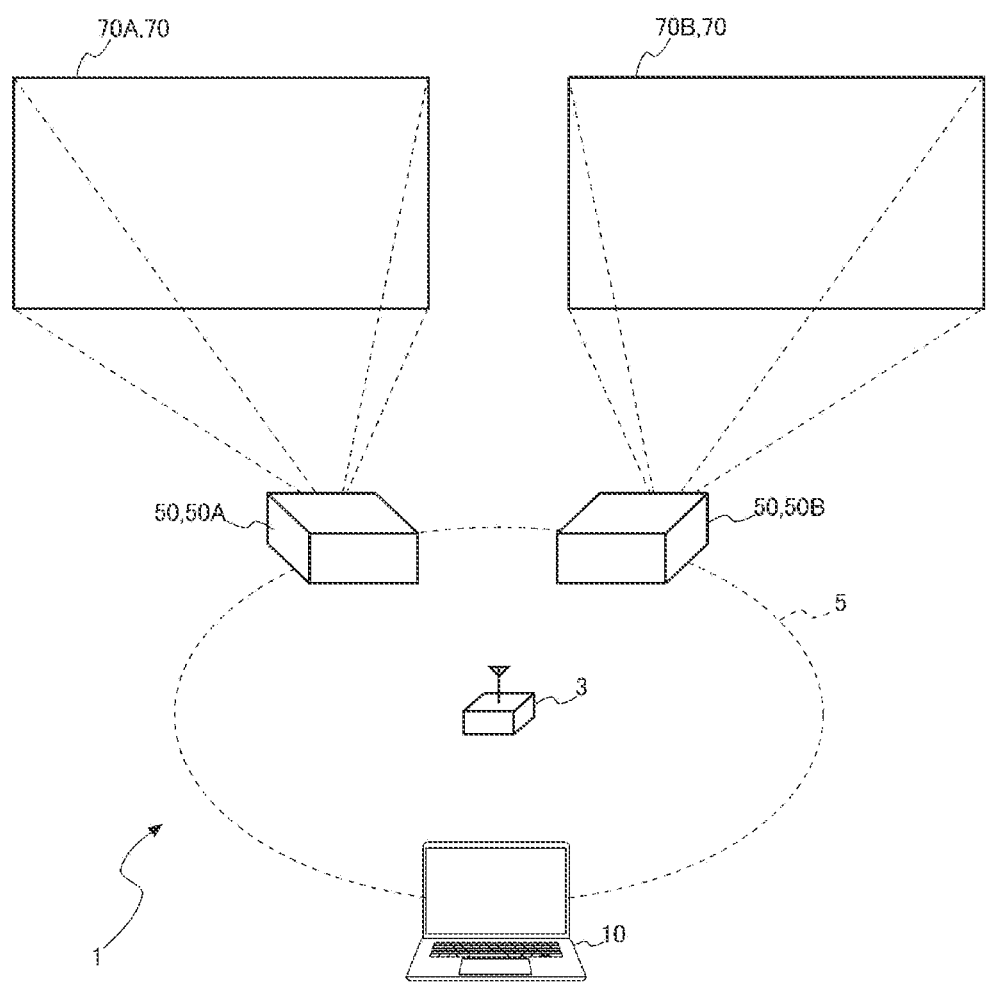
FIG. 1 is a diagram showing the configuration of a display system.

FIG. 1 is a diagram showing the configuration of a display system 1. The display system 1 includes an image output device 10, a first projector 50A, and a second projector 50B. In the following explanation, the first projector 50A and the second projector 50B are sometimes collectively referred to as projectors 50. In FIG. 1, two projectors 50 including the first projector 50A and the second projector 50B are shown. However, the number of projectors 50 may be one or may be three or more. The first projector 50A and the second projector 50B are equivalent to the display device. The first projector 50A is equivalent to the first display device and the second projector 50B is equivalent to the second display device.

The image output device 10 and the projectors 50 are connected to a wireless network 5 constructed by a wireless router 3 and perform data communication with each other via the wireless router 3.

The wireless router 3 is a device having an access point function. The wireless router 3 constructs the wireless network 5 and relays data communication between devices connected to the wireless network 5. The wireless router 3 is connected to a global network and relays data communication between a server device and the like connected to the global network and the image output device 10 connected to the wireless network 5.

The image output device 10 is a device that supplies image data and audio data to the projectors 50. In the following explanation, the image data and the audio data are sometimes collectively referred to as content data. The image data supplied to the projectors 50 by the image output device 10 is data of a moving image but may be data of a still image. As the image output device 10, for example, a personal computer, a tablet computer, or a smartphone is used.

The image output device 10 supplies, to the projectors 50, content data distributed from the server device via a network such as the Internet. The image output device 10 supplies, to the projectors 50, content data recorded in a medium such as a DVD (Digital Versatile Disc) or a Blu-ray and content data stored in a first storage 21 included in the image output device 10. Blu-ray is a registered trademark. In the following explanation, the content data stored in the first storage 21 is supplied to the projectors 50.

The projectors 50 display, on projection surfaces 70, images based on image data received from the image output device 10 and output, with speakers 57, audio based on audio data received from the image output device 10. The projection surfaces 70 on which the projectors 50 display the image may be, for example, screens or may be, for example, walls in a room or white boards. The projection surfaces 70 are equivalent to the display surface.

The first projector 50A and the second projector 50B respectively display images on different projection surfaces 70. The first projector 50A projects an image onto a projection surface 70A. The second projector 50B projects an image onto a projection surface 70B. In FIG. 1, the first projector 50A and the second projector 50B respectively display the images on different projection surfaces 70A and 70B. However, the first projector 50A and the second projector 50B may display the images on the same projection surface 70.

2. Configuration of the Image Output Device

Figure 2:
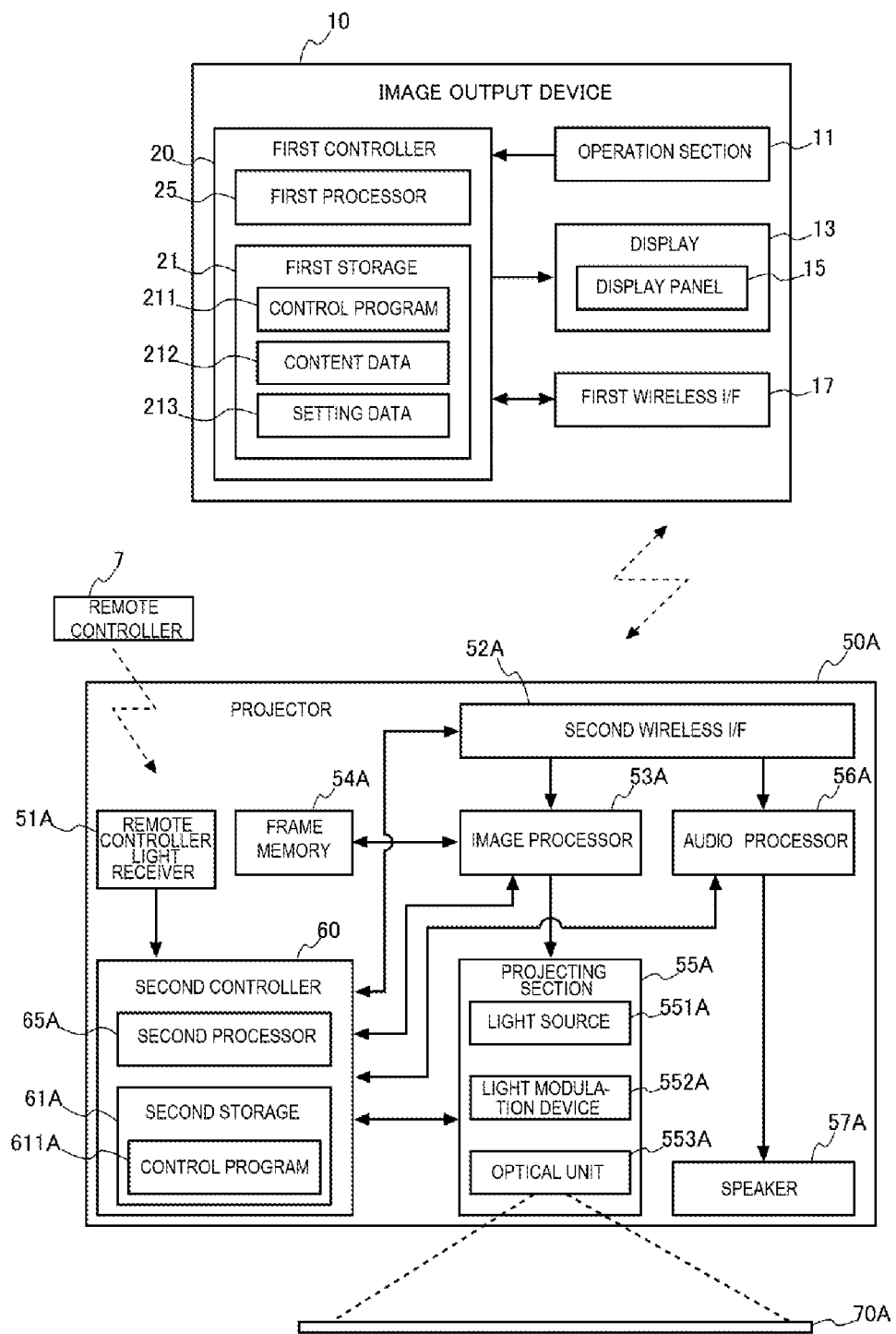
FIG. 2 is a block diagram showing the configurations of an image output device and a projector.

FIG. 2 is a block diagram showing the configurations of the image output device 10 and the projector 50A. First, the configuration of the image output device 10 is explained. The image output device 10 includes an operation section 11, a display 13, a first wireless I/F (interface) 17, and a first controller 20.

The operation section 11 is a receiver that receives operation of a user and is configured by an input device such as a mouse or a keyboard.

The display 13 includes a display panel 15 such as an LCD (Liquid Crystal Display) or an organic EL (Electro-Luminescence) display. The display 13 causes the display panel 15 to display an image based on image data generated by the first controller 20.

The first wireless I/F 17 is a wireless communication device including an I/F circuit or the like and performs data transmission and reception according to a Wi-Fi communication standard. Wi-Fi is a registered trademark.

The first controller 20 is a computer device including the first storage 21 and a first processor 25.

The first storage 21 includes a volatile memory such as a RAM (Random Access Memory) and a nonvolatile memory such as a ROM (Read Only Memory). The first storage 21 includes an auxiliary storage device such as an SSD (Solid State Drive) or a HDD (Hard Disk Drive). The first storage 21 stores a control program 211 for controlling the operation of the image output device 10, content data 212, and setting data 213.

The setting data 213 is data concerning operation setting for the image output device 10. The setting data 213 includes setting concerning priority of the first projector 50A and the second projector 50B. The priority is transmission priority of image data and audio data. The image output device 10 determines channels used for data transmission such that communication traffic of a channel used for data transmission to the projector 50 having high priority is smaller than communication traffic of a channel used for data transmission to the projector 50 having low priority.

For example, the user operates the operation section 11 and sets the priority of the first projector 50A and the second projector 50B connected to the wireless network 5 constructed by the wireless router 3. The first controller 20 causes the first storage 21 to store, as the setting data 213, the priority setting received by the operation section 11. In this embodiment, it is assumed that the priority of the first projector 50A is set to a first priority level and the priority of the second projector 50B is set to a second priority level.

The first processor 25 is an arithmetic processing device configured by a CPU (Central Processing Unit) or an MPU (Micro Processing Unit). The first processor 25 executes the control program 211 to control the sections of the image output device 10.

The first controller 20 acquires communication traffics of channels used for communication with the projectors 50. The first controller 20 transmits empty dummy packets to the channels and measures elapsed times from when the first controller 20 transmits the dummy packets until when the first controller 20 receives response packets, which are responses to the dummy packets, from the projectors 50. The first controller 20 acquires, based on the measured elapsed time, communication traffics indicating congestion states of the channels. The communication traffics indicate data amounts transferred by the wireless network 5 in a unit time and indicate congestion states of the channels.

When acquiring the communication traffics, the first controller 20 determines, based on the acquired communication traffics, channels used to transmit audio data and image data.

First, a case in which the image output device 10 transmits content data to only the projector 50A is explained.

The first controller 20 preferentially transmits, of audio data and image data included in the content data 212, the audio data to the projector 50A. When a delay occurs in the transmission of the image data, frame missing occurs and an image is not smoothly reproduced. When a delay occurs in the transmission of the audio data, interruption occurs in audio and the user cannot supplement audio of an interrupted portion. Therefore, since the influence by the delay is larger when the delay occurs in the transmission of the audio data, the first controller 20 preferentially transmits the audio data to the projector 50A.

The first controller 20 determines, as a channel used for audio data communication, a channel having the smallest communication traffic among usable channels. The determined channel used for the audio data communication is referred to as first channel. A frequency band of the first channel is a first frequency band.

The first controller 20 determines, as a channel used for image data communication, a channel having the smallest communication traffic next to the first channel among the usable channels. The determined channel used for the image data communication is referred to as second channel. A frequency band of the second channel is a second frequency band.

The first controller 20 notifies, to the first wireless I/F 17, information concerning the frequency bands of the first channel and the second channel, information concerning types of data transmitted using the channels, and information concerning a data transmission destination. The information concerning the data types is information indicating whether a type of data is audio data or image data. The information concerning the data transmission destination is, for example, information concerning an IP address of the first projector 50A.

Subsequently, the first controller 20 reads out image data and audio data from the first storage 21, adds a time stamp indicating time to the read-out image data and the read-out audio data, and outputs the image data and the audio data to the first wireless I/F 17. When the image data and the audio data are input to the first wireless I/F 17 from the first controller 20, the first wireless I/F 17 transmits the input audio data using the first channel of the frequency band notified from the first controller 20. The first wireless I/F 17 transmits the image data input from the first controller 20 using the second channel of the frequency band notified from the first controller 20.

Subsequently, a case in which the image output device 10 transmits the same content data to the first projector 50A and the second projector 50B is explained. The first controller 20 determines, according to the priority included in the setting data 213, channels used to transmit the content data to the first projector 50A and the second projector 50B. The priority of the first projector 50A is set to a first priority level and the priority of the second projector 50B is set to a second priority level.

The first controller 20 determines, as a first channel used to transmit audio data to the first projector 50A, a channel having the smallest communication traffic. The first controller 20 determines, as a second channel used to transmit image data to the first projector 50A, a channel having the smallest communication traffic next to the first channel. The first controller 20 determines, as a third channel used to transmit audio data to the second projector 50B, a channel having the smallest communication traffic next to the second channel. A frequency band of the third channel is equivalent to the third frequency band. The first controller 20 determines, as a fourth channel used to transmit image data to the second projector 50B, a channel having the smallest communication traffic next to the third channel.

The first controller 20 notifies, to the first wireless I/F 17, information concerning frequency bands of the first channel and the second channel, information concerning types of data transmitted using the channels, and information concerning a data transmission destination. The information concerning the data transmission destination is, for example, information concerning an IP address of the first projector 50A.

The first controller 20 notifies, to the first wireless I/F 17, information concerning frequency bands of the third channel and the fourth channel, information of types of data transmitted using the channels, and information concerning a data transmission destination. The information concerning the data transmission destination is, for example, information concerning an IP address of the second projector 50B.

The first controller 20 may repeatedly perform, in every unit time, processing for acquiring communication traffics of the channels. The first controller 20 may change, based on the acquired latest communication traffics of the channels, a frequency band used to transmit audio data and a frequency band used to transmit image data. For example, when the channel having the smallest communication traffic is changed as a result of communication traffic reacquisition, the first controller 20 determines, as the first channel used to transmit the audio data to the first projector 50A, the channel having the smallest communication traffic after the change. Similarly, the first controller 20 determines the second to fourth channels based on the result of the communication traffic reacquisition.

When at least one of the first to fourth channels is changed, the first controller 20 changes, at timing when the transmission of the audio data to the first projector 50A and the second projector 50B is stopped, a channel used to transmit the audio data or the image data. Examples of the timing for stopping the transmission of the audio data to the projectors 50 include timing when the user operates the operation section 11 and presses a temporary stop button and timing for changing a moving image to be reproduced.

When receiving a notification of delay occurrence from the first projector 50A or the second projector 50B, the first controller 20 reduces a data amount per unit time of the image data and the audio data transmitted to the projector 50 from which the notification is received.

When display timing of the received image data is delayed behind output timing of the received audio data, the projector 50 does not display, on the projection surface 70, the image data for which the delay occurs. When an image that cannot be displayed on the projection surface 70 is generated because of a delay, the projector 50 transmits a notification of the delay occurrence to the image output device 10. When receiving the notification of the delay occurrence from the projector 50, the first controller 20 reduces a data amount per unit time of the image data and the audio data transmitted to the projector 50 from which the notification is received.

3. Configuration of the Projector

Subsequently, the configuration of the projectors 50 is explained. The first projector 50A and the second projector 50B include substantially the same configuration. Therefore, in the following explanation, the configuration of the first projector 50A is representatively explained. In the following explanation, a sign "A" is added to components of the first projector 50A and a sign "B" is added to components of the second projector 50B. For example, a second controller 60 included in the first projector 50A is described as "second controller 60A" and the second controller 60 included in the second projector 50B is described as "second controller 60B".

The first projector 50A includes a remote controller light receiver 51A, a second wireless I/F 52A, an image processor 53A, a frame memory 54A, a projecting section 55A, a audio processor 56A, a speaker 57A, and a second controller 60A.

The remote controller light receiver 51A receives an infrared signal transmitted from a remote controller 7. The remote controller light receiver 51A decodes the received infrared signal and generates an operation signal corresponding to the received infrared signal. The operation signal generated here is a signal corresponding to a button of the remote controller 7 operated by the user. The remote controller light receiver 51A outputs the generated operation signal to the second controller 60A.

The second wireless I/F 52A is a wireless communication device including an I/F circuit or the like and performs data transmission and reception according to the Wi-Fi communication standard. The second wireless I/F 52A extracts a time stamp included in the audio data received by the first channel and outputs the extracted time stamp to the second controller 60A. The second wireless I/F 52A outputs the received audio data to the audio processor 56A.

The second wireless I/F 52A extracts a time stamp included in image data received by the second channel and outputs the extracted time stamp to the second controller 60A. The second wireless I/F 52A outputs the received image data to the image processor 53A.

The image processor 53A writes the input image data in the frame memory 54A frame by frame. The frame memory 54A includes a plurality of banks. The banks have a storage capacity for enabling one frame of the image data to be written. The frame memory 54A is configured by, for example, an SDRAM (Synchronous Dynamic Random Access Memory).

The image processor 53A performs, on the image data expanded on the frame memory 54A, image processing such as resolution conversion processing, resize processing, distortion aberration correction, shape correction processing, digital zoom processing, or adjustment for a tint and luminance of an image. The image processor 53A executes image processing designated by the second controller 60A and, according to necessity, performs processing using parameters input from the second controller 60A. The image processor 53A is naturally capable of executing a plurality of kinds of image processing among the kinds of image processing explained above in combination. The image processor 53A reads out image data for which the processing has ended from the frame memory 54A and outputs the image data to a light modulation device 552A.

The projecting section 55A includes a light source 551A, the light modulation device 552A, and an optical unit 553A. The projecting section 55A is equivalent to the display.

The light source 551A is configured by a lamp such as a halogen lamp, a xenon lamp, or an ultrahigh pressure mercury lamp or a solid-state light source such as an LED or a laser light source.

The light modulation device 552A includes a light modulation element and modulates light emitted by the light source 551A to generate image light. The light modulation element may be a transmissive liquid crystal panel or may be a reflective liquid crystal panel. The light modulation element may be configured by a digital mirror device.

The optical unit 553A includes an optical element such as a projection lens and enlarges and projects the image light generated by the light modulation device 552A toward the projection surface 70A. Consequently, an image based on the image light is displayed on the projection surface 70A.

The audio processor 56A is configured by, for example, a processor for audio processing. The audio processor 56A D/A-converts audio data input from the second wireless I/F 52A into an analog audio signal. The second wireless I/F 52A amplifies the converted audio signal and outputs the amplified audio signal with the speaker 57A. The speaker 57A is equivalent to the audio output device.

The image processor 53A, the frame memory 54A, and the audio processor 56A are configured by, for example, an integrated circuit. The integrated circuit includes an LSI, an ASIC (Application Specific Integrated Circuit), a PLD (Programmable Logic Device), an FPGA (Field-Programmable Gate Array), and an SoC (System-on-a-chip). An analog circuit may be included in a part of the configuration of the integrated circuit. The second controller 60A and the integrated circuit may be combined.

The second controller 60A is a computer device including a second storage 61A and a second processor 65A.

The second storage 61A includes a volatile memory such as a RAM and a nonvolatile memory such as a ROM. The second storage 61A stores a control program 611A to be executed by the second processor 65A.

The second processor 65A is an arithmetic processing device configured by a CPU or an MPU. The second processor 65A executes the control program 611A and controls the sections of the first projector 50A.

The time stamp extracted from the audio data by the second wireless I/F 52A and the time stamp extracted from the image data by the second wireless I/F 52A are input to the second controller 60A. The second controller 60A compares the input time stamps and determines whether it is possible to synchronously reproduce the audio data and the image data.

When time indicated by the time stamp added to the image data is delayed behind time indicated by the time stamp added to the audio data, the second controller 60A instructs the image processor 53A to stop processing the image data. The instruction is referred to as stop instruction.

The image data to be a target that the second controller 60A causes the image processor 53A to stop processing is the image data, the time indicated by the time stamp added to which is determined as being delayed behind the time indicated by the time stamp added to the audio data. When an image that cannot be displayed on the projection surfaces 70 because of the delay is generated, the second controller 60A transmits a notification of the delay occurrence to the image output device 10.

When the stop instruction is input to the image processor 53A from the second controller 60A, the image processor 53A stops processing for a frame of the target image data and does not output the image data to the projecting section 55A. The image processor 53A expands and overwrites image data sequentially input from the second wireless I/F 52A on the frame memory 54A on which the image data for which the processing is stopped is expanded.

4. First Operation of the Image Output Device

Figure 3:
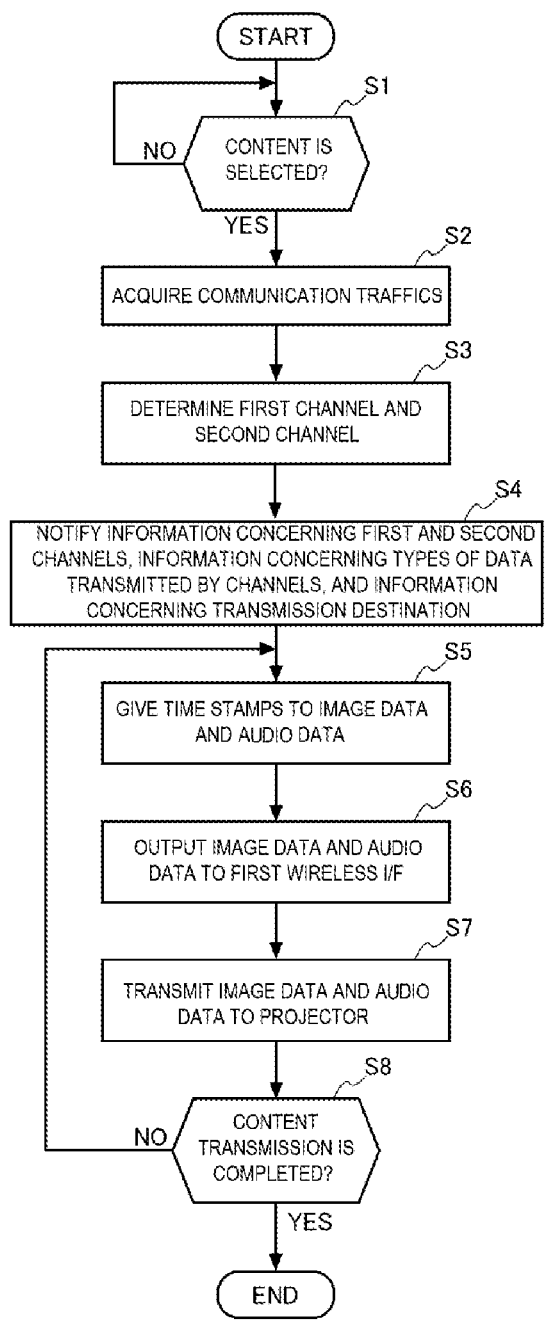
FIG. 3 is a flowchart showing the operation of the image output device.

FIG. 3 is a flowchart showing a first operation of the image output device 10. The first operation of the image output device 10 is explained with reference to the flowchart of FIG. 3. The first operation is an operation performed when content data is transmitted to one projector 50. The first controller 20 determines whether operation for selecting content is received by the operation section 11 (step S1). When the operation for selecting content is not received (NO in step S1), the first controller 20 stands by for a start of processing until the operation is received.

When the operation for selecting content is received (YES in step S1), the first controller 20 acquires communication traffics (step S2). The first controller 20 acquires, as the communication traffics, elapsed times from when the first controller 20 transmits dummy data for each of usable channels until when responses to the dummy data are received from the projector 50.

Subsequently, the first controller 20 determines, based on the acquired communication traffics of the channels, a first channel used to transmit audio data and a second channel used to transmit image data (step S3).

Subsequently, the first controller 20 notifies, to the first wireless I/F 17, information concerning frequency bands of the determined first and second channels, information concerning types of data transmitted using the channels, and information concerning a data transmission destination (step S4).

Subsequently, the first controller 20 gives time stamps respectively to the image data and the audio data included in the content data 212 selected in step S1 (step 35).

Subsequently, the first controller 20 outputs, to the first wireless I/F 17, the image data and the audio data to which the time stamps are given (step S6).

The first wireless I/F 17 transmits the input audio data to the projector 50 with the first channel and transmits the input image data to the projector 50 with the second channel (step S7).

Subsequently, the first controller 20 determines whether the transmission of the content data 212 is completed (step S8). When the transmission of the content data 212 is not completed (NO in step S8), the first controller 20 returns to step S5. When the transmission of the content data 212 is completed (YES in step S8), the first controller 20 ends this processing flow.

5. Operation of the Projector

Figure 4:
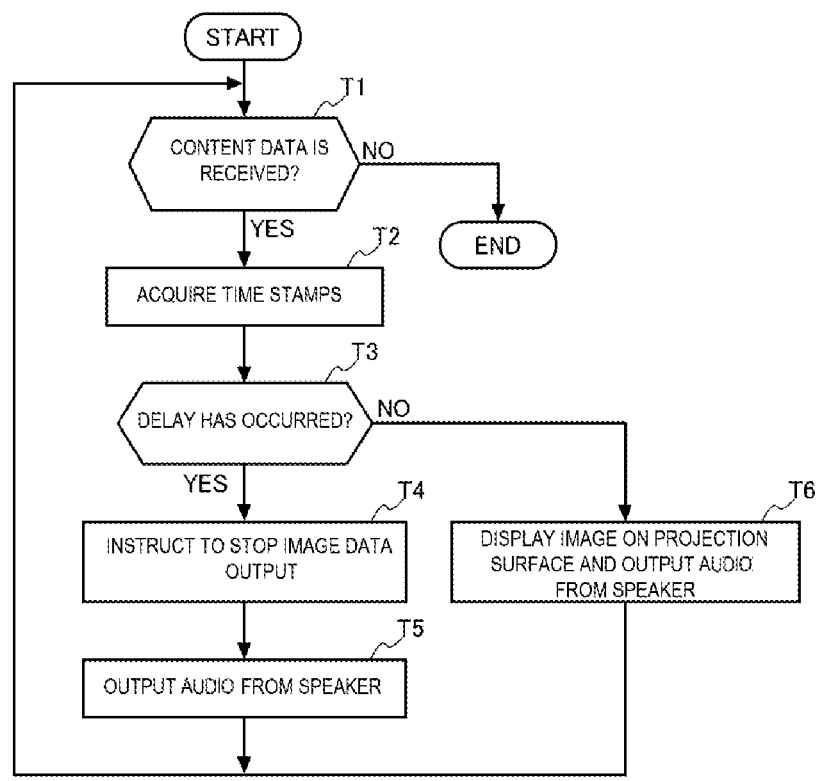
FIG. 4 is a flowchart showing the operation of the projector.

FIG. 4 is a flowchart showing the operation of the projector 50. The operation of the projector 50 is explained with reference to the flowchart of FIG. 4.

The second controller 60 determines whether the content data 212 is received from the image output device 10 (step T1). When the content data 212 is not received from the image output device 10 (NO in step T1), the second controller 60 stands by for a start of processing until the content data 212 is received.

When the content data 212 is received (YES in step T1), the second controller 60 acquires the time stamps respectively included in the received audio data and the received image data (step T2).

The second controller 60 compares the acquired two time stamps and determines whether the time stamp acquired from the image data is delayed compared with the time stamp acquired from the audio data (step T3).

When the time stamp acquired from the image data is delayed behind the time stamp acquired from the audio data (YES in step T3), the second controller 60 instructs the image processor 53A not to output the image data to the projecting section 55A (step T4). The image data stopped being output is image data to which the time stamp compared with the time stamp of the audio data in step T3 is added.

The image processor 53A instructed not to output the image data by the second controller 60 ends the instructed processing for the image data and does not output the image data to the projecting section 55A. The image processor 53A overwrites the image data expanded on the frame memory 54A with the image data sequentially input from the second wireless I/F 52A.

The audio processor 56A D/A-converts the audio data input from the second wireless I/F 52A into an analog audio signal, amplifies the audio signal, and outputs the audio signal from the speaker 57A (step T5).

When determining that the time stamp acquired from the image data is not delayed behind the time stamp acquired from the audio data (NO in step T3), the second controller 60 does not output an instruction to the image processor 53A. Accordingly, the image processor 53A subjects the image data input from the second wireless I/F 52A to image processing and outputs the image data subjected to the image processing to the projecting section 55A (step T6). The audio processor 56A D/A-converts the audio data input from the second wireless I/F 52A into an analog audio signal, amplifies the audio signal, and outputs the audio signal from the speaker 57A (step T6).

6. Second Operation of the Image Output Device

FIG. 5 is a flowchart showing a second operation of the image output device 10. The second operation is an operation of the image output device 10 performed when the content data 212 is supplied to a plurality of first and second projectors 50A and 50B. The operation of the image output device 10 is explained with reference to the flowchart of FIG. 5. Since the operation in step S11 is the same as step S1 of the flowchart shown in FIG. 3, explanation of the operation is omitted.

When communication traffics of channels are acquired (step S12), the first controller 20 determines a first channel, a second channel, a third channel, and a fourth channel based on the acquired communication traffics (step S13).

The first channel is a channel used to transmit audio data to the first projector 50A, the priority of which is set to a first priority level. The second channel is a channel used to transmit audio data to the projector 50B, the priority of which is set to a second priority level. The third channel is a channel used to transmit image data to the first projector 50A, the priority of which is set to the first priority level. The fourth channel is a channel used to transmit image data to the second projector 50B, the priority of which is set to the second priority level.

Subsequently, the first controller 20 notifies, to the first wireless I/F 17, information concerning frequency bands of the determined first, second, third, and fourth channels, information concerning types of data transmitted using the channels, and information concerning a data transmission destination (step S14).

Subsequently, the first controller 20 gives time stamps respectively to the image data and the audio data included in the content data 212 selected in step S11 (step S15).

Subsequently, the first controller 20 outputs, to the first wireless I/F 17, the image data and the audio data to which the time stamps are given (step S16). The first wireless I/F 17 transmits the input audio data to the first projector 50A with first channel and transmits the input image data to the first projector 50A with the third channel (step S17).

The first wireless I/F 17 transmits the input audio data to the second projector 50B with the second channel and transmits the input image data to the second projector 50B with the fourth channel (step S18).

Subsequently, the first controller 20 determines whether the transmission of the content data 212 is completed (step S19). When the transmission of the content data 212 is not completed (NO in step S19), the first controller 20 returns to step S15. When the transmission of the content data 212 is completed (YES in step S19), the first controller 20 ends this processing flow.

7. Effects

As explained above, the image output device 10 in this embodiment is a device that performs wireless communication with the projectors 50 using a plurality of frequency bands and includes the first controller 20. The first controller 20 executes performing wireless communication with the projectors 50 using a first frequency band and a second frequency band and acquiring communication traffic of the first frequency band and communication traffic of the second frequency band. When the communication traffic of the first frequency band is smaller than the communication traffic of the second frequency band, the first controller 20 executes transmitting audio data using the first frequency band and transmitting image data using the second frequency band.

With this configuration, since the audio data is transmitted using the first frequency band having the smaller communication traffic than the second frequency band used to transmit the image data, it is possible to stably transmit the audio data to the projectors 50.

The projectors 50 include the first projector 50A and the second projector 50B having the lower priority than the first projector 50A. When transmitting the audio data to the first projector 50A using the first frequency band, the first controller 20 transmits the audio data to the second projector 50B using a third frequency band. The first frequency band has smaller communication traffic than the third frequency band.

With this configuration, it is possible to more stably transmit the audio data to the first projector 50A having the higher priority than to the second projector 50B having the low priority.

The first controller 20 acquires, in every unit time, the communication traffic of the first frequency band and the communication traffic of the second frequency band. When the communication traffic of the first frequency band is larger than the communication traffic of the second frequency band, the first controller 20 uses the second frequency band for the transmission of the audio data and uses the first frequency band for the transmission of the image data.

With this configuration, since the communication traffic of the first frequency band and the communication traffic of the second frequency band are acquired in every unit time, it is possible to update, based on the latest communication traffic, a frequency band set as the first frequency band and a frequency band set as the second frequency band.

As explained above, the display system 1 in this embodiment is the system including the image output device 10 and the projectors 50. The image output device 10 includes the first controller 20 that executes acquiring communication traffic of a first frequency band and communication traffic of a second frequency band used for wireless communication with the projectors 50 and, when the communication traffic of the first frequency band is smaller than the communication traffic of the second frequency band, transmitting audio data using the first frequency band and transmitting image data using the second frequency band. The projectors 50 include the speakers 57 and projecting sections 55. The projectors 50 include the second controllers 60 that execute receiving the audio data and the image data, causing the speakers 57 to output audio based on the received audio data, and causing the projecting sections 55 to display an image based on the image data on the projection surfaces 70.

With this configuration, it is possible to stably transmit the audio data to the projectors 50.

When reception timing of the image data is delayed behind reception timing of the audio data, the second controller 60 does not display the image data on the projection surfaces 70.

With this configuration, when audio and an image deviate, the image is prevented from being displayed. Therefore, it is possible to reduce discomfort felt by the user.

When a delay of image data occurs, the second controller 60 notifies the occurrence of the delay to the image output device 10.

With this configuration, the image output device 10 that receives notifications from the projectors 50 can adjust data amounts of the image data transmitted to the projectors 50.

The embodiment and the modifications are preferred implementation modes of the present disclosure. However, not only this but various modified implementations are possible in a range not departing from the gist of the present disclosure.

For example, the processing units of the flowcharts of FIGS. 3 and 5 are divided according to main processing contents in order to facilitate understanding of the processing of the image output device 10. The present disclosure is not limited by a way of division and names of the processing units of the flowcharts of FIGS. 3 and 5. According to processing contents, the processing of the image output device 10 can be divided into a larger number of processing units or can be divided such that one processing unit includes a larger number of kinds of processing. The processing order of the flowcharts explained above is not limited to the illustrated example.

Similarly, the processing units of the first projector 50A shown in FIG. 4 are divided according to main processing contents in order to facilitate understanding of the processing of the first projector 50A. The present disclosure is not limited by a way of division and names of the processing units shown in the flowchart of FIG. 4. According to processing contents, the processing of the first projector 50A can be divided into a larger number of processing units or can be divided such that one processing unit includes a larger number of kinds of processing. The processing order of the flowchart explained above is not limited to the illustrated example.

The functional sections of the image output device 10 and the first projector 50A shown in FIG. 2 indicate functional components realized by cooperation of hardware and software. A specific implementation form of the functional sections is not particularly limited. Therefore, hardware individually corresponding to the functional sections does not always need to be implemented. It is also naturally possible to realize functions of a plurality of functional sections by one processor executing a program. A part of the functions realized by software in the embodiment may be realized by hardware. A part of the functions realized by hardware in the embodiment may be realized by software.

The display device according to the present disclosure is not limited to the projector that projects an image onto the projection surface 70. For example, the display device includes a liquid crystal display device that displays an image on a liquid crystal display panel and a self-luminous type display device such as a display device that displays an image on an organic EL panel. Other various display devices are also included in the display device according to the present disclosure.

When the control method for the image output device according to the present disclosure is realized using a computer implemented in the image output device 10, a program to be executed by the computer can also be configured in a form of a recording medium. The program to be executed by the computer can also be configured in a form of a transmission medium that transmits the program. As the recording medium, a magnetic or optical recording medium or a semiconductor memory device can be used. Specifically, examples of the recording medium include portable and stationary recording media such as a flexible disk, a HDD, a CD-ROM (compact disc read-only memory), a DVD, a Blu-ray Disc, a magneto-optical disk, a flash memory, and a card-type recording medium. The recording medium may be a nonvolatile storage device such as a RAM, a ROM, or a HDD, which is an internal storage device included in the server device.

What is claimed is:

1. A control method for an image output device, the control method comprising:
    performing wireless communication with a first displayer using a first frequency band and a second frequency band;
    acquiring communication traffic of the first frequency band and communication traffic of the second frequency band; and
    determining the first frequency band used to transmit audio data and the second frequency band to transmit image data based on the communication traffic of the first frequency band and the communication traffic of the second frequency band,
    wherein the communication traffic of the first frequency band is smaller than the communication traffic of the second frequency band,
    the acquiring includes acquiring, for each unit time, the communication traffic of the first frequency band and the communication traffic of the second frequency band, and
    the determining includes changing a frequency band used to transmit audio data from the first frequency band to the second frequency band and a frequency band to transmit image data from the second frequency band to the first frequency band based on the latest communication traffic of the first frequency band and the latest communication traffic of the second frequency band.

2. The control method for the image output device according to claim 1, further comprising, when transmitting the audio data to the first displayer using the first frequency band, transmitting the audio data to a second displayer having lower priority than the first displayer using a third frequency band having larger communication traffic than the communication traffic of the first frequency band.

3. The control method for the image output device according to claim 1, wherein the changing includes changing the first frequency band and the second frequency band when a transmission of the audio data is stopped.

4. The control method for the image output device according to claim 1, further comprising,
giving time stamps respectively to the image data and the audio data; and
determining whether it is possible to synchronously replay the audio data and the image data based on the time stamps.

5. The control method for the image output device according to claim 1, wherein, when reception of the image data is delayed behind reception of the audio data, not displaying an image on a display surface.

6. The control method for the image output device according to claim 1, further including notifying the first displayer that the reception of the image data is delayed behind the reception of the audio data.

7. A display system comprising:
an image output device including:
a first wireless communication circuit configured to perform wireless communication using a first frequency band and a second frequency band; and
a first processor programmed to execute:
acquiring communication traffic of the first frequency band and communication traffic of the second frequency band; and
determining the first frequency band used to transmit audio data and the second frequency band to transmit image data based on the communication traffic of the first frequency band and the communication traffic of the second frequency band,
wherein the communication traffic of the first frequency band is smaller than the communication traffic of the second frequency band,
the acquiring includes acquiring, for each unit time, the communication traffic of the first frequency band and the communication traffic of the second frequency band, and the determining includes changing a frequency band used to transmit audio data from the first frequency band to the second frequency band and a frequency band to transmit image data from the second frequency band to the first frequency band based on the latest communication traffic of the first frequency band and the latest communication traffic of the second frequency band; and a first displayer including:
a second wireless communication circuit configured to perform wireless communication with the image output device using the first frequency band and the second frequency band;
an audio output speaker configured to output audio based on the audio data;
a transmissive light modulator or a reflective light modulator; and
a second processor programmed to display an image based on the image data using the transmissive light modulator or the panel reflective light modulator.

8. The display system according to claim 7, wherein, when reception of the image data is delayed behind reception of the audio data, the second processor does not display the image on a display surface.

9. The display system according to claim 8, wherein the second processor notifies the image output device that the reception of the image data is delayed behind the reception of the audio data.

10. The display system according to claim 7, wherein the first processor is further programmed to execute, when transmitting the audio data to the first displayer using the first frequency band, transmitting the audio data to a second displayer having lower priority than the first displayer using a third frequency band having larger communication traffic than the communication traffic of the first frequency band.

11. The display system according to claim 7, wherein the first processor is further programmed to execute changing the first frequency band and the second frequency band when a transmission of the audio data is stopped.

12. The display system according to claim 7, wherein the first processor is further programmed to execute,
giving time stamps respectively to the image data and the audio data; and
determining whether it is possible to synchronously replay the audio data and the image data based on the time stamps.

* * * * *